United States Patent
Griszbacher

(10) Patent No.: US 9,656,427 B2
(45) Date of Patent: May 23, 2017

(54) CONTROLLING BUILD CHAMBER TEMPERATURE

(71) Applicant: MakerBot Industries, LLC, Brooklyn, NY (US)

(72) Inventor: James Griszbacher, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

(21) Appl. No.: 14/219,450

(22) Filed: Mar. 19, 2014

(65) Prior Publication Data

US 2015/0190968 A1    Jul. 9, 2015

Related U.S. Application Data

(63) Continuation of application No. 14/147,567, filed on Jan. 5, 2014.

(51) Int. Cl.
| | |
|---|---|
| *B29C 67/00* | (2017.01) |
| *H05B 3/00* | (2006.01) |
| *B29C 41/02* | (2006.01) |
| *B33Y 10/00* | (2015.01) |
| *B33Y 30/00* | (2015.01) |
| *B33Y 50/02* | (2015.01) |

(52) U.S. Cl.
CPC .......... *B29C 67/0088* (2013.01); *B33Y 10/00* (2014.12); *B33Y 30/00* (2014.12); *B33Y 50/02* (2014.12)

(58) Field of Classification Search
CPC .......... B23K 1/02; B23K 1/0263; B29C 35/08

USPC .................................................. 219/492, 413
See application file for complete search history.

(56) References Cited

U.S. PATENT DOCUMENTS

| | | | | |
|---|---|---|---|---|
| 4,282,422 | A | * 8/1981 | Payne | ................ G05D 23/1913 219/448.12 |
| 4,743,821 | A | 5/1988 | Hall | |
| 4,818,562 | A | * 4/1989 | Arcella | .................. B22D 23/06 118/429 |
| 5,017,753 | A | 5/1991 | Deckard | |
| 5,457,766 | A | 10/1995 | Ko | |
| 5,645,862 | A | 7/1997 | Sable et al. | |
| 5,866,058 | A | 2/1999 | Batchelder | |
| 5,986,241 | A | 11/1999 | Funahashi | |

(Continued)

FOREIGN PATENT DOCUMENTS

WO    WO 2015103458    7/2015

OTHER PUBLICATIONS

USPTO, "U.S. Appl. No. 14/147,567, Non Final Office Action mailed Jun. 16, 2016", 7 pages.

(Continued)

*Primary Examiner* — Brian Jennison
(74) *Attorney, Agent, or Firm* — Strategic Patents, P.C.

(57) ABSTRACT

A build chamber of a three-dimensional printer uses directed heat to preheat a region within the chamber where a build will be initiated, and then uses circulating, heated air to maintain a target temperature for the entire build volume after the build is initiated. A fixed heating element and blower may advantageously be used for both heating steps, and preheating may be accomplished more quickly by initially directing heat at the locus of build initiation rather than diffusing heat throughout an entire build volume.

20 Claims, 5 Drawing Sheets

(56) References Cited

U.S. PATENT DOCUMENTS

| | | |
|---|---|---|
| 6,153,142 A | 11/2000 | Chari et al. |
| 6,261,077 B1 * | 7/2001 | Bishop .................... B29C 41/46 264/401 |
| 6,553,190 B1 | 4/2003 | Rodriguez |
| 6,722,872 B1 | 4/2004 | Swanson et al. |
| 6,986,654 B2 | 1/2006 | Imiolek et al. |
| 7,008,209 B2 | 3/2006 | Iskra et al. |
| 7,027,887 B2 | 4/2006 | Gaylo et al. |
| 7,073,442 B2 | 7/2006 | Fedor et al. |
| 7,279,874 B2 | 10/2007 | Masuda |
| 7,306,758 B2 | 12/2007 | Nielsen et al. |
| 7,339,712 B2 | 3/2008 | Kerekes et al. |
| 8,021,593 B2 | 9/2011 | Murata et al. |
| 8,143,964 B2 | 3/2012 | Takeuchi |
| 8,303,088 B2 | 11/2012 | Hibbard et al. |
| 8,598,553 B2 | 12/2013 | Appleby et al. |
| 8,633,780 B2 | 1/2014 | Takeuchi |
| 2004/0005182 A1 | 1/2004 | Gaylo et al. |
| 2004/0178531 A1 | 9/2004 | Nielsen et al. |
| 2006/0215246 A1 | 9/2006 | Kerekes et al. |
| 2013/0154160 A1 | 6/2013 | Cooper |
| 2013/0164004 A1 | 6/2013 | Ai |
| 2013/0213951 A1 * | 8/2013 | Boedicker et al. ........... 219/413 |
| 2013/0320589 A1 | 12/2013 | Fujita |
| 2015/0190966 A1 | 7/2015 | Griszbacher |

OTHER PUBLICATIONS

WIPO, "PCT Application No. PCT/US15/10017 Notification Concerning Transmittal of International Preliminary Report on Patentability mailed Jul. 14, 2016", 10 pages.

International Search Authority, "International Application Serial No. PCT/US15/10017, Search Report and Written Opinion mailed Jun. 1, 2015", 14 pages.

USPTO, "U.S. Appl. No. 14/147,567 Notice of Allowance mailed Nov. 9, 2016", 7 pages.

* cited by examiner

CONTROLLING BUILD CHAMBER TEMPERATURE

RELATED APPLICATION

This application is a continuation of U.S. patent application Ser. No. 14/147,567 filed Jan. 5, 2014, the entire content of which is hereby incorporated by reference.

FIELD OF THE INVENTION

This document generally relates to a device and method for controlling build chamber temperature, and more specifically controlling build chamber temperature in a device and system for three-dimensional fabrication.

BACKGROUND

Certain additive manufacturing techniques such as three-dimensional printing use thermoplastics or the like that can be deposited in a heated, liquid form and then cooled to provide a resulting solid structure. Some systems use a heated build chamber in order to mitigate thermal stresses and other difficulties that arise from the thermal expansion and contraction of build materials during fabrication. While the heated build chamber usefully regulates the thermal environment for a build process, there is typically a significant amount of heating inefficiency, particularly early in the fabrication process when only a small amount of build material requires any thermal management. There remains a need for improved heating techniques that direct initial heating toward the region(s) in a build chamber where a build will be initiated.

SUMMARY

A build chamber of a three-dimensional printer uses directed heat to preheat a region within the chamber where a build will be initiated, and then uses circulating, heated air to maintain a target temperature for the entire build volume after the build is initiated. A fixed heating element and blower may advantageously be used for both heating steps, and preheating may be accomplished more quickly by initially directing heat at the locus of build initiation rather than diffusing heat throughout an entire build volume.

In one aspect, a device includes a build chamber of a three-dimensional printer, where the build chamber includes a build region where a build is initiated. The device further includes a heater and a blower that moves air at a variable flow rate in response to a control signal. The blower is positioned to move the air over the heater toward the build region. Additionally, the device includes a sensor that provides a sensor signal indicative of a temperature of the build region, and a controller that varies the control signal in response to the sensor signal. The control signal drives the blower at a first flow rate to preheat the build region before initiating the build, and the control signal drives the blower at a second flow rate, which may be greater than the first flow rate, to heat the build chamber after initiating the build.

In general, in another aspect, a method includes providing a predetermined temperature for initiating a build in a build region of a build chamber of a three-dimensional printer. The method further includes preheating the build region to the predetermined temperature by directing air with a blower at a first flow rate over a heater and toward the build region. Additionally, the method includes initiating the build when the build region reaches the predetermined temperature, and heating the build chamber by directing the air with the blower at a second flow rate over the heater, where the second flow rate may be greater than the first flow rate.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the devices and methods described herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms.

Described herein are devices, systems, and methods for controlling the build chamber temperature for a three-dimensional printer such as any of the printers described in commonly-owned U.S. Pat. Nos. 8,282,380 & 8,425,218, the entire contents of which are hereby incorporated by reference. It will be understood that while the exemplary embodiments herein emphasize controlling the build chamber temperature for a three-dimensional printer, the principles of this disclosure may be adapted to other fabrication processes. All such variations that can be adapted to use a device, system, and method for controlling a build chamber temperature as described herein are intended to fall within the scope of this disclosure.

Figure 1:
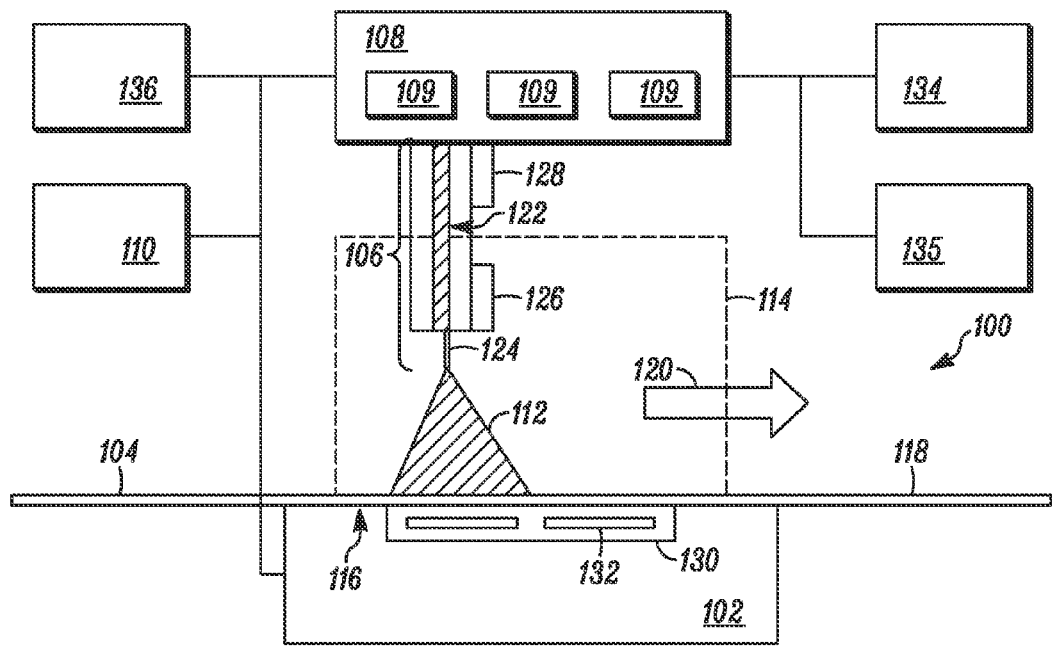
FIG. 1 is a block diagram of a three-dimensional printer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heater that provides active heating to the build platform 102, a cooling element that provides active cooling to the build platform 102, or a combination of these. The heater 130 may be coupled in a communicating relationship with the controller 110 in order for the controller 110 to controllably impart heat to or remove heat from the surface 116 of the build platform 102. Thus, the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyor by dissolving the layer of chemical treatment between the object 112 and the conveyer 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyer 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware, or within a web page provided by a web server hosted by the three-dimensional printer 100. Thus, in one aspect there is a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and the like.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and the like. Other hardware 135 may also or instead include a variety of cable connections and/or hardware adapters for connecting to, e.g., external computers, external hardware, external instrumentation or data acquisition systems, and the like.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as BluTooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

A device for controlling a build chamber temperature of a three-dimensional printer will now be described.

Figure 2:
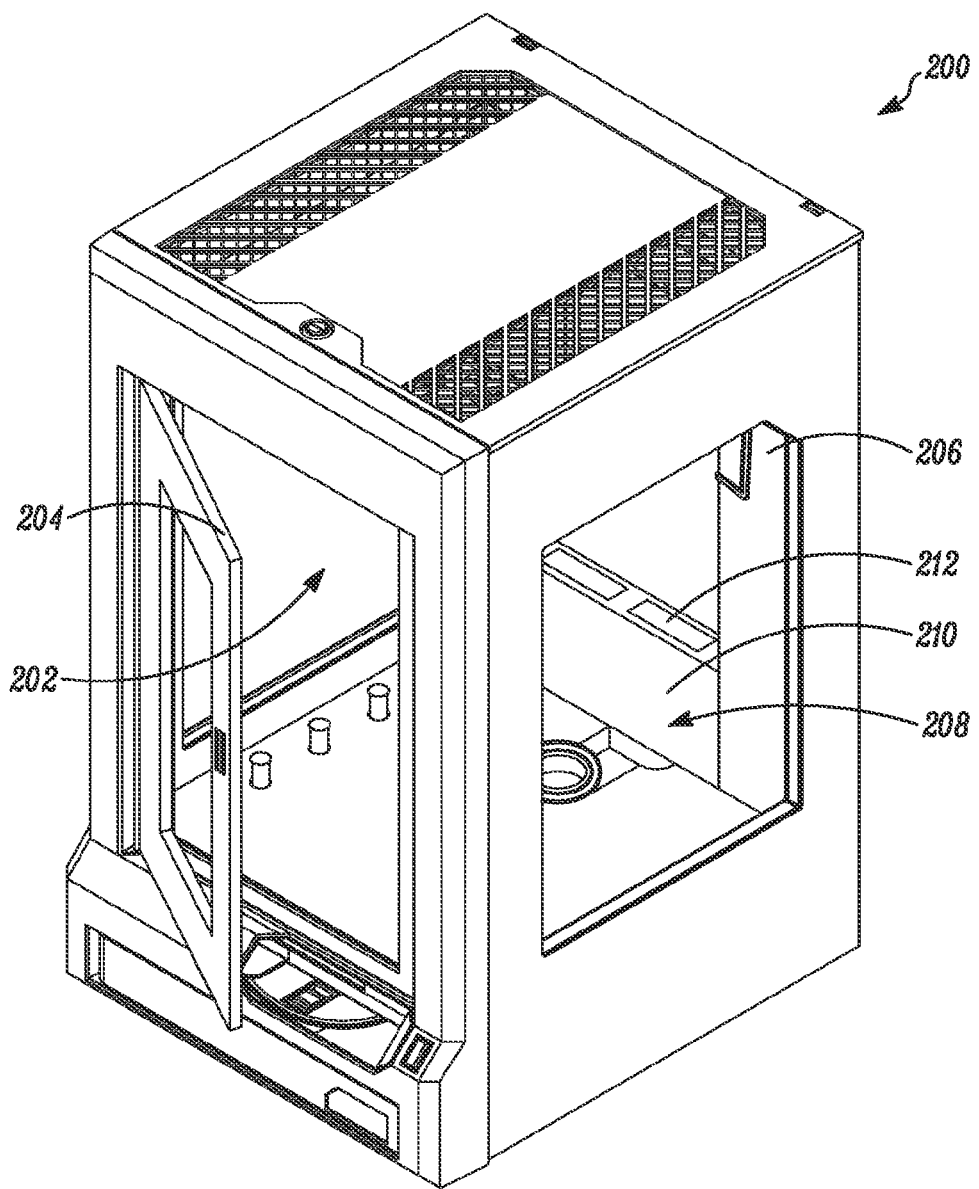
FIG. 2 is a perspective view of a three-dimensional printer.

FIG. 2 is a perspective view of a three-dimensional printer. The three-dimensional printer 200 may include a build chamber 202 that is sealed from the surrounding environment with a door 204 in a front portion of the three-dimensional printer 200 and one or more viewing areas 206 in side portions of the three-dimensional printer 200. The door 204 may provide access to the build chamber 202 of the three-dimensional printer 200, e.g., in order to load, unload or otherwise handle objects and materials within the build chamber 202. However, one skilled in the art will recognize that the build chamber 202 may instead be partially or completely open, and that many configurations for a build chamber are possible including, but not limited to, configurations having multiple access points to the build chamber and configurations having fewer or more viewing areas, which may each be sealed or unsealed. The build chamber 202 may include a build platform, an extruder, and an x-y-z positioning assembly, along with any other components described above with reference to FIG. 1.

The build chamber 202 may also include a heater 208 for heating the build chamber 202. The heater 208 may be disposed in a housing 210 or other ductwork with an opening 212 to direct air over a heating element within the heater 208. The opening 212 may include a louvered opening as shown in FIG. 2, which may be configured to direct heated air from the housing 210 into the build chamber 202 in one direction or a plurality of directions. For example, heated air may be directed to a build region of the build chamber 202 in which a build is initiated in the three-dimensional printer 200. The build region, as used throughout this disclosure, may include the volume in which the build is initiated and/or the region where the build takes place throughout a three-dimensional print (i.e., the region where the build material is extruded). Depending on the configuration of the printer 200, this build region may be fixed at a stationary position within the build chamber 202 throughout a build (e.g., where an extruder remains stationary throughout a build) or the build region may move on any or all of the x, y, and z axes. The opening 212 may also be adjustable (manually, automatically, or a combination thereof) in order to steer a direction of the heated air. Heated air may be moved by components (e.g., mechanical components such as a fan) included within the housing 210 of the heater 208, or through components located elsewhere (e.g., otherwise disposed in the build chamber 202, or disposed outside of the build chamber 202).

Figure 3:
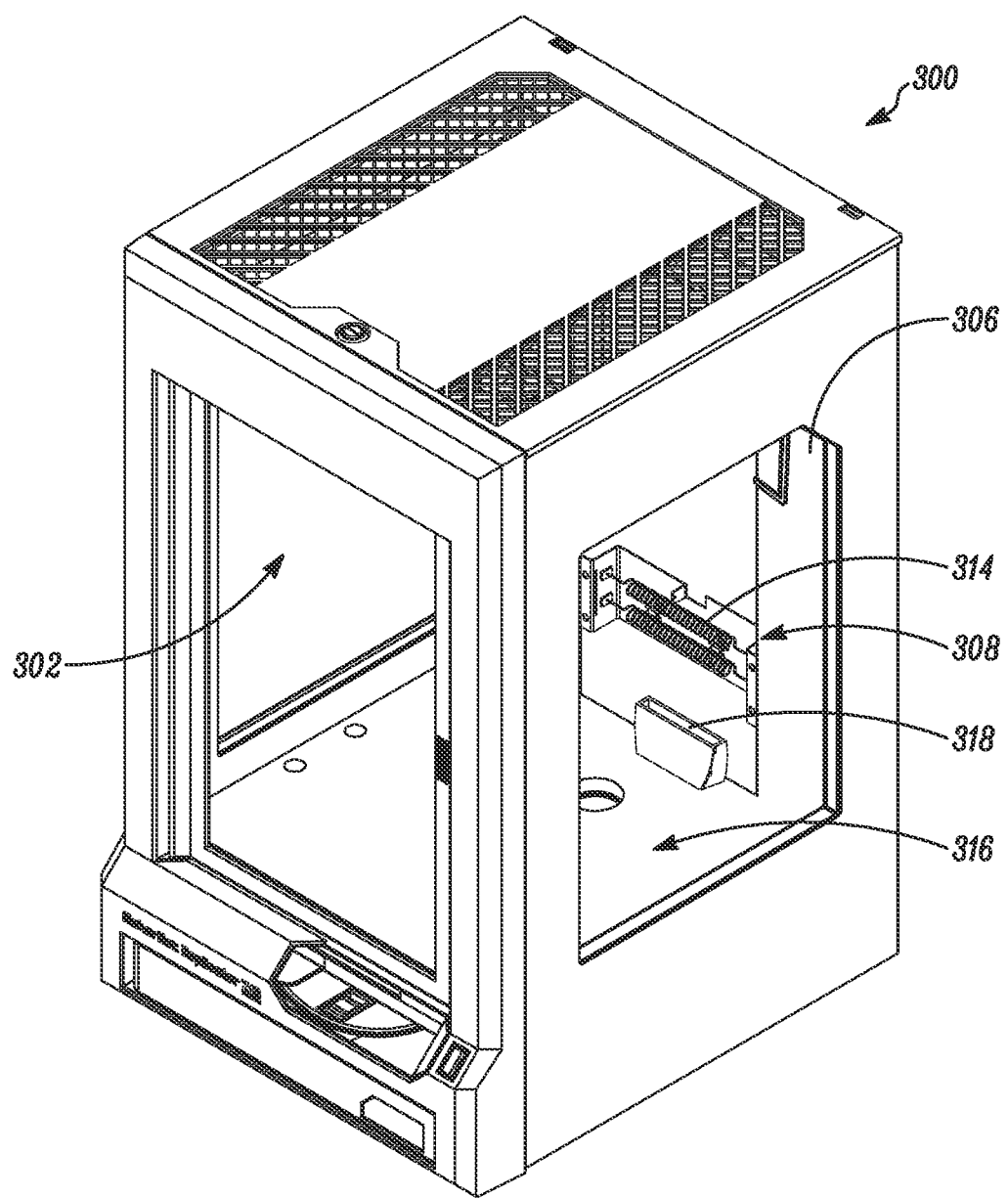
FIG. 3 is a perspective view of a three-dimensional printer.

FIG. 3 is a perspective view of a three-dimensional printer. In general, the three-dimensional printer 300 may include a build chamber 302, viewing areas 306, and a heater 308. As shown in FIG. 3, a housing for the heater may be omitted and air may be directed over a heater 308 that is open to the build chamber 302.

The heater 308 may include coil heaters 314 as shown, or any other heaters known to one of ordinary skill in the art and suitable for creating temperatures and heat transfers as contemplated herein. The heater 308 may also or instead include a metal heater (e.g., wire, ribbon, strip, etched foil, and the like), a heat lamp (e.g., an incandescent lamp, and the like), ceramic heaters (e.g., molybdenum disilicide, positive temperature coefficient (PTC) ceramic elements, and the like), composite heaters (e.g., tubular heaters, screen-printed elements, and the like), combination heater systems (e.g., thick film technology, and the like), or any other heater or combination of heaters known in the art or that will be known in the art.

The three-dimensional printer 300 may also include a blower 316, which may be disposed near (e.g., adjacent to) the heater 308. The blower 316 may include a fan (not shown in FIG. 3) and an opening 318 that directs air past the heater 308 in order to heat air moving over the heater 308. The blower 316 may also or instead include centrifugal fans, axial fans, centrifugal blowers, positive-displacement blowers, cross-flow fans, bellows, Coanda effect devices, convective devices, electrostatic devices, or any combination of elements that can be used to create a flow of air. The devices and systems described herein may also include a plurality of blowers.

It will be understood that while a particular orientations of heaters, blowers and openings/ducting are shown in FIGS. 2 and 3, a variety of configurations may also or instead usefully be employed. For example, the housing 208 of FIG. 2 is positioned on a back wall of a build chamber 202 and oriented to direct air upward along the back wall. This air flow will tend to redirect from a vertical flow along the back wall to a horizontal flow along a top of the build chamber, which tendency may be enhance by suitably shaping the upper rear edge into which the air is initially directed. This approach may be advantageously used with a build platform that is initially positioned near a top of the build chamber and moves downward as a build progresses. Thus air from the blower will always be directed toward a region where new material is being deposited without requiring any active steering of air flow during a build. At the same time, this general approach directs heated air upward, consistent with and improved by the natural upward convection current of heated air.

While this configuration usefully adapts to the natural air currents that result from heating, other approaches may also or instead be employed. For example, a build platform may be positioned near a bottom of the build chamber and used with an x-y gantry that moves upward along a z-axis during a print. In such a printer, heated air may be directed downward along a sidewall so that air flow reflects along an edge and horizontally inward toward the build region, or the air may be initially directed horizontally above and/or beneath the build platform. Air may initially be flowed across the build platform at a relatively low flow rate so that heated air can transfer heat to preheat a build region. As the build region moves upward in the layers of an object being fabricated, air flow along the bottom may be increased (as described below) to circulate air at a greater flow rate throughout the chamber.

Figure 4:
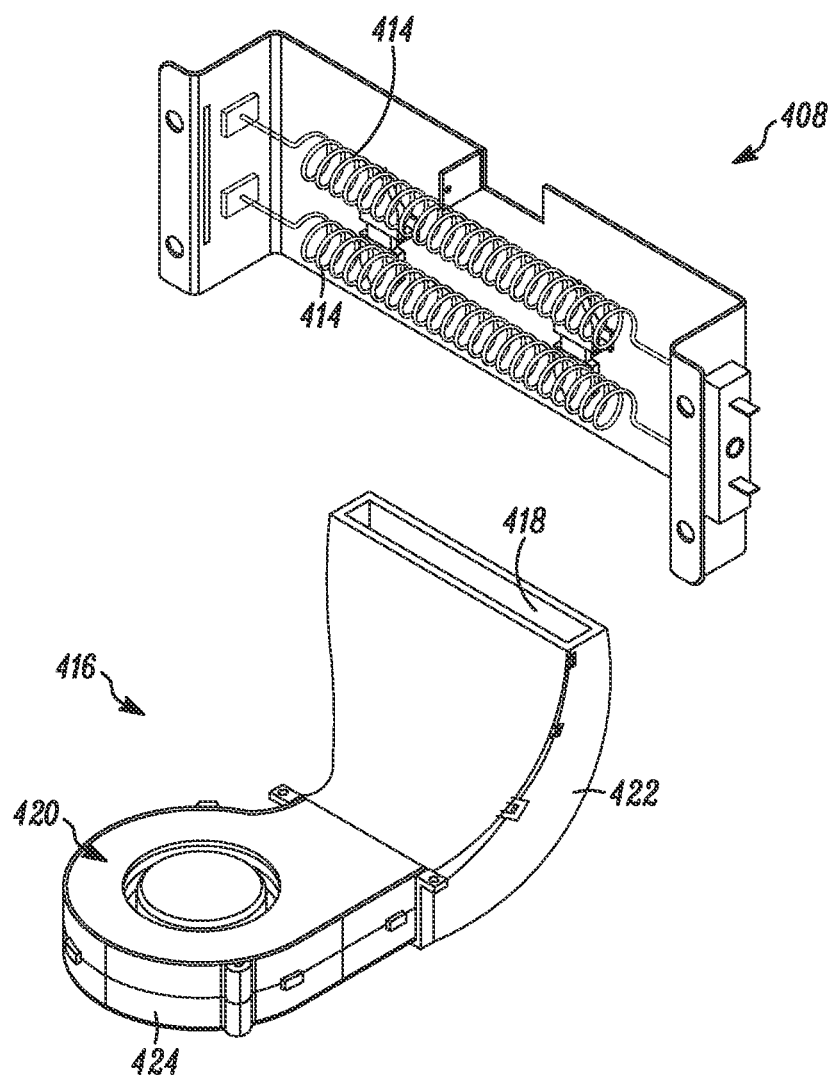
FIG. 4 is a perspective view of a blower and heater.

FIG. 4 depicts an implementation of the heater 408 and blower 416, where the heater 408 includes coil heaters 414, and the blower 416 includes a fan 420. The blower 416 may further include a curved duct 422 or similar ductwork with an opening 418 directed toward the coil heaters 414. Additionally, the blower 416 may include a housing 424 that holds the mechanical elements of the fan 420 that creates air flow (e.g., fan blades, motor, etc.).

The aforementioned mechanical components can be used to create a device and method for controlling the temperature of a build chamber of a three dimensional printer. For example, a build region where a build is to be initiated may be preheated to a predetermined temperature before initiating a build, after which the entire build chamber may be maintained at a second predetermined temperature while the build completes. An implementation includes heating the build region to the desired build region temperature in a rapid manner. This may be accomplished, for example by slowly moving air over the heater and toward the build region, thus increasing the time for heat transfer to the air, and for heat transfer from the air to the build region. When the build region achieves the desired build region temperature, the system may transition to a mode for heating the entire build chamber to its desired build chamber temperature. This latter step may be accomplished by increasing the flow rate of air in order to more vigorously mix and temper air throughout the build chamber.

The desired build region temperature and the desired build chamber temperature may be predetermined temperatures based on, for example, the type of build material being used in a three-dimensional printing system. The desired build region temperature and the desired build chamber temperature may be the same temperature, or these may be different temperatures. Determining the desired temperature may include first identifying parameters for heating the build chamber and/or identifying parameters for changing the heating environment during a build process.

For example, the predetermined temperature for preheating the build region may be about 60° C., which may be a preferred temperature for the build region when extruding polylactic acid (PLA) or some other build material in a three-dimensional printing process. Other materials may have different useful operating ranges. Thus, for example, the build region might usefully be preheated to a higher temperature such as about 65-70° for acrylonitrile butadiene styrene (ABS) or the like. The predetermined temperature may also include even higher temperatures. For example, the predetermined temperature may be close to or equal to the glass transition temperature of the build material (e.g., 110° C. for ABS). Moreover, the predetermined temperature may be lower than 60° C. The predetermined temperature may provide a threshold for starting a build, so that the build is initiated only when the build region reaches the predetermined temperature. Similarly, when the build region is below the predetermined temperature, such as when a printer is powered on or following a prolonged pause in printing activity, a build may begin with a preheating step in which the build region is heated up to the predetermined temperature. The heater and blower described herein can reduce the wait time required to heat the build region, as distinguished from the build chamber generally, by directing heated air slowly over the heater and the build region.

In one aspect, a three-dimensional printer may include a heater such as any of the heaters described above, along with a blower configured to move air at a variable flow rate in response to a control signal. As noted above, a lower flow rate may be used to more quickly heat the build region, while a higher flow rate may be used to generally heat the build chamber. A controller may control operation of the printer as it moves from the preheat mode to the build chamber heating mode as described herein. The controller may provide the control signal based in whole or in part on a sensor signal received from a sensor such as a thermistor that provides a sensor signal indicative of a temperature within the build volume. For example, the sensor may be positioned to directly measure the temperature of the build region where a build is to be initiated, or to more generally measure a temperature at any suitable location within the build chamber from which a temperature of the build region can be inferred. In one aspect, the control signal may drive the blower at a first speed (to obtain a first flow rate) used to preheat the build region before initiating the build and at a second speed (to obtain a second flow rate) to heat the entire build chamber after initiating the build. As noted above, the second flow rate may be greater than the first flow rate.

Thus, in the implementations depicted in FIGS. 3 and 4, the blower 316, 416 moving air over the coil heaters 314, 414 at a reduced flow rate may heat the build region more quickly than the blower 316, 416 moving air over the coil heaters 314, 414 at an increased flow rate. As discussed above, this heating behavior is generally improved by the tendency of heated air to rise, and the improved heat transfer to and from the heated air that is possible at lower flow rates. One of ordinary skill will appreciate that other control techniques are possible, such as using a second flow rate less than the first flow rate, or flow rates in both modes that vary over time.

As shown in FIG. 4, the blower 416 may include a fan 420, and the first flow rate and the second flow rate may be determined by a rotational speed of the fan 420. For example, in order to move air at the first flow rate, the fan 420 may have a first rotational speed, and in order to move air at the second flow rate, the fan 420 may have a second rotational speed, where the second rotational speed may be greater than the first rotational speed.

The sensor may be a temperature sensor, which, for example, may be a thermistor, infrared sensor, infrared camera, or other thermally sensitive device. The sensor may be located and configured such that it senses the temperature in the build region, in a region adjacent to the heater, or anywhere else in the build chamber where build chamber and build region temperatures can be directly measured or accurately inferred. The device may also include a plurality of sensors such as a first sensor to measure the build region temperature and a second sensor to measure a build chamber temperature. This may also include multiple sensors to take sensors at different locations used to determine an average temperature, e.g., for the build region or the build chamber. The sensor may also or instead include a flow rate sensor that senses the flow rate of air from the blower, and the sensor signal may include the flow rate of air in the build chamber. In an embodiment where the blower includes a fan, the sensor may also or instead include a rotational speed sensor, and the sensor signal may include a rotational speed of the fan. In another aspect, fan speed and corresponding flow rates may be inferred by a voltage or current applied to a fan motor.

In order to control the build chamber temperature and/or the temperature of the build region, the heater may also or instead be configured to provide variable heat in response to a heat control signal. The controller may be configured to vary the heat control signal in response to the sensor signal. This may usefully include adjusting the supplied heat as the flow rate of air over the heater changes in any suitable manner to achieve a desired heat transfer.

There may be a predetermined standard operating flow rate for circulating air in the build chamber of a three-dimensional printer. In an implementation, after the build region is heated to the desired build region temperature, the blower may adjust a flow rate to the predetermined standard operating flow rate. For example, the second flow rate may be equal to the predetermined standard operating flow rate, such that the blower moves air the first flow rate to preheat the build region before initiating the build, and at the predetermined standard operating flow rate to circulate air in the build chamber after initiating the build. The standard operating flow rate may cause the build chamber to reach a substantially uniform temperature, or otherwise distribute heat in the build chamber. The standard operating flow rate may also or instead mix the air in the build chamber in a desired manner.

In addition to varying the control signal to drive the blower at the first and second flow rates, the controller may also be configured to initiate the build when the build region is heated to the predetermined temperature. In other words, the controller may send a build signal to the three-dimensional printer to initiate the build. This build signal may be sent in response to the sensor signal provided to the controller.

The flow rate of the blower may be increased (e.g., from the first flow rate to the second flow rate) after the build is initiated, which may be at any time after the build is initiated—for example, during fabrication of a first layer of the build, after fabrication of a first layer of the build, after a specified time, after a specified volume of build material has been extruded, when the build has moved out of a specified volume where the build was initiated, when the build region has moved out of an air path of the blower, and so on.

A method for controlling a build chamber temperature of a three-dimensional printer will now be described.

Figure 5:
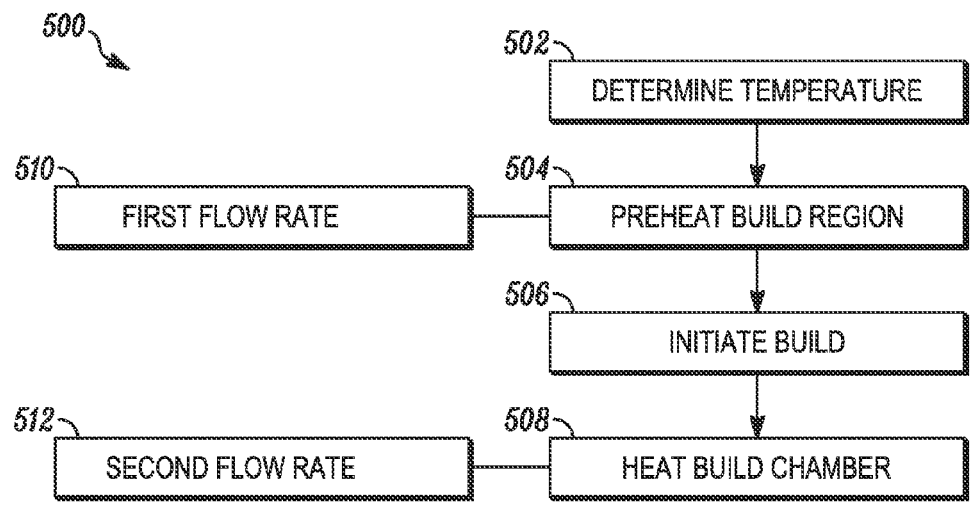
FIG. 5 is a flow chart illustrating a method for controlling a build chamber temperature.

FIG. 5 illustrates a method 500 for controlling a build chamber temperature of a three-dimensional printer, where step 502 includes determining a predetermined temperature for initiating a build in a build region of a build chamber of a three-dimensional printer (e.g., the desired build region temperature). Step 504 includes preheating the build region to the predetermined temperature, which may be achieved by directing air with a blower at a first flow rate 510 over a heater and toward the build region. This may include sensing a temperature of the build region with a sensor such as any of the sensors described above. Step 506 includes initiating the build when the build region reaches the predetermined temperature. Lastly, step 508 includes heating the build chamber, which may be achieved by directing air with the blower at a second flow rate 512 over the heater. The second flow rate may be greater than the first flow rate. The build chamber may be heated after the build region reaches the predetermined temperature, after a build has been initiated, after a build region has moved out of a direct path of the blower, or at any other suitable time.

As noted above, the heater may also provide a variable, controllable output, and the method 500 may include varying a heat output from the heater at any suitable time(s) during a build process, or in response to any suitable criteria such as a heated air temperature, a target temperature for the build chamber, a target temperature for the build region, and so forth.

Figure 6:
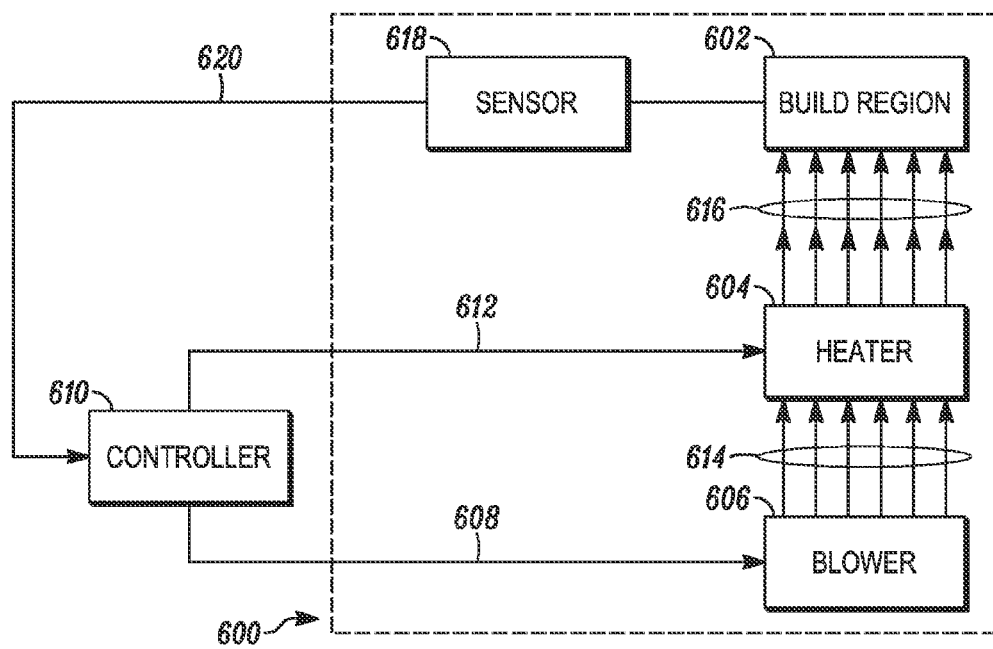
FIG. 6 is a block diagram illustrating a temperature control system.

FIG. 6 is a block diagram illustrating a temperature control system. As shown in FIG. 6, a build chamber 600 of a three-dimensional printer may include a build region 602. This may include any region where a build may be initiated, such as a particular location on a build platform, an entire build platform, a volume around an extrusion tool, or any other useful volume or location for initiating a build. A heater 604 may provide heat, and a blower 606 may move air at a variable flow rate in response to a blower control signal 608 from a controller 610. The heater 604 may also provide variable heat in response to a heater control signal 612 from the controller 610. The blower 606 may be positioned to move unheated air 614 over the heater 604, which then creates heated air 616 that may be moved toward the build region 602 (e.g., by the blower 606 or due to heated air rising vertically within the build chamber or some combination of these) in order to heat the build region 602 to a predetermined temperature. A sensor 618 may provide a sensor signal 620 indicative of a temperature of the build region 602. The controller 610 may then vary one or more of the control signals 608, 612 in response to the sensor signal 620. The blower control signal 608 may drive the blower 606 at a first flow rate to preheat the build region 602 before initiating the build, and the blower control signal 608 may drive the blower 606 at a second flow rate, which may be greater than the first flow rate, to heat the build chamber 600 after initiating the build. The heater control signal 612 may vary the heat output of the heater 604 to either heat up or cool down the build region 602 and/or build chamber 600.

According to the foregoing, disclosed herein there is a three-dimensional printer configured to rapidly heat a build region within a build chamber to a predetermined printing temperature, and then maintain a target temperature for an entire volume of the build chamber after the build has been initiated. This may include using a blower with a fan or the like that blows air across a heater and through the build region at a low flow rate during a preheat of the build region to a first predetermined temperature, and at a higher flow rate to circulate air and maintain the build chamber at a second predetermined temperature after the build has been initiated. The blower flow rate may be increased, e.g., after the first layer of the build is completed, after a predetermined time, after the build region has moved out of a flow path of the blower, after the build region reaches the first predetermined temperature, after the build is initiated, after the build chamber reaches the second predetermined temperature, or at any other suitable time that can be determined by the controller. In an embodiment, the air distribution and temperature distribution across the build chamber may be monitored with sensors, which may be in communication with a controller that sends a control signal to at least one of the blower and the heater.

The blower and heater may also be used after initiation of the build in a control loop with any number of temperature sensors to maintain a temperature of the build chamber at a predetermined target temperature. An implementation may also include cooling the build chamber, e.g., if the build chamber exceeds a maximum temperature. For example, the heater may be turned completely off, and the blower may move air in the build chamber in order to cool the build chamber. Where more rapid cooling is desired, active cooling elements may be employed, or an exhaust vent or the like may be provided to exchange heated air within the build chamber with cooler ambient air. In an embodiment, a sensor may constantly monitor the temperature of the build region and/or the build chamber, and the flow rate of the blower may be continuously adjusted, or adjusted according to the constantly monitored temperature.

As discussed herein, the devices and methods may involve determining a desired build region temperature for initiating a build in the build region of the build chamber of a three-dimensional printer, and identifying parameters for determining the desired build region temperature. Such parameters may include, but are not limited to, the build material, the build size (surface area, volume, density, etc.), geometry, time, printing schedule, and so on. Additionally, an implementation includes a system and method for limiting build chamber heating based on the size and geometry of the build. For example, if a build is below a predetermined size, the build chamber is not be heated.

The devices and methods described herein may be implemented through computer software (as explained below), and may include a control system that automatically controls the temperature and/or flow rate of air throughout the build chamber. This may include an implementation where the control signal is generated by a computer program. Thus, an implementation may include a device and method that does not include a sensor. Alternatively, the control system may include a feedback system that uses at least one sensor as described herein. For example, the control system may adjust the temperature of the build chamber and/or build region based on a sensed temperature (e.g., by sending a control signal to vary the flow rate of the blower or the heat output of the heater). For example, the control scheme for the blower may use a switched mode power supply (SMPS) (e.g., a buck converter). The control system may also or instead utilize pulse-width modulation (PWM) control, pulse-duration modulation (PDM) control, thermostatic control, linear voltage regulation, resistors, diodes, volt modding, manual fan speed control, software control, and so on, in order to control the blower, heater, or any other component of a three-dimensional printing system.

An implementation utilizing PWM control with separate heater sections will now be described. The heater in an implementation may include at least two separate heater sections such that the heater is not operated from a single electronics output device. Further, the separate heater sections may be driven independently from one another. The amount of heat produced from the separate heater sections may be controlled with a PWM scheme, which may switch the heaters off and on at a substantially high frequency and may vary the duty cycle (on time versus off time). The heater being broken up into at least two separate and independently controllable sections may allow for intelligent PWM control of the separate heater sections in a synchronized or complementary fashion. For example, the heaters may be operated at a 50% duty cycle (50% of the time the heaters are on, and 50% of the time the heaters are off), which may be accomplished through turning the at least two heater sections on at the same time and then off at the same time. Alternatively, it may benefit the power supply if the separate heater sections are driven 180 degrees out of phase. Out of phase operation may effectively spread out the power demanded from the power supply, which may be beneficial over a large instantaneous power demand. For example, the spreading of power demand may benefit electrical components within the power supply by reducing the peak power seen by the electrical components. This may extend the power supply lifetime. Thus, it may be advantageous to break up a large electrical heater load into separate smaller sections and intelligently drive them with a PWM scheme, which may place the heater drive sections out of phase with one another. This drive scheme may reduce strain on an associated DC power supply stage by reducing peak current and peak power demand, which may increase the projected power supply lifetime.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the invention(s) described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
   a three-dimensional printer including an extruder, a build chamber including a build region where a build is to be initiated, an x-y-z positioning assembly operable to move the extruder within the build chamber, and a controller configured to cooperate with the extruder and the x-y-z positioning assembly to fabricate a three-dimensional object on a build platform within the build chamber;
   a heater configured to heat the build chamber, the heater including at least two separate and independently controllable heating elements;
   a blower positionable to move air over the heater and toward the build region at a first flow rate before fabrication of the three-dimensional object is initiated for preheating the build region to a predetermined build region temperature and, after preheating the build region to the predetermined build region temperature, to increase a flow rate of air over the heater to a second flow rate for maintaining a target temperature for the build chamber after fabrication of the three-dimensional object is initiated, wherein the second flow rate more vigorously mixes air throughout the build chamber relative to the first flow rate;
   a power source configured to supply power to the heater; and
   a controller configured to provide pulse-width modulation (PWM) control of the heating elements in a manner that staggers an on-cycle among the heating elements to reduce a peak load demand on the power source.

2. The system of claim 1 wherein the controller is configured to switch the heating elements off and on in a synchronized fashion.

3. The system of claim 1 wherein the controller is configured to switch the heating elements off and on in a complementary fashion.

4. The system of claim 1 wherein the controller is configured to vary a duty cycle of the heating elements.

5. The system of claim 1 wherein the controller is configured to allocate 50% of a predetermined duty cycle to the at least two separate heating elements.

6. The system of claim 5 wherein the predetermined duty cycle is a duty cycle required to drive one of the at least two separate heating elements at a predetermined power.

7. The system of claim 1 wherein the controller is configured to operate one of the at least two heating elements out of phase with another one of the at least two heating elements.

8. The system of claim 7 wherein the heating elements are operated 180 degrees out of phase.

9. The system of claim 7 wherein the heater includes a plurality of separate and independently controllable heating elements, wherein "N" is equal to the number of heating elements, and wherein the heating elements are operated 360/N degrees out of phase thereby evenly distributing operation of the heating elements.

10. The system of claim 1 wherein the heating elements are coil heaters.

11. A method comprising:
    providing a three-dimensional printer including a power supply and a build chamber that includes a build platform and a build region where a build is to be initiated;

driving a heater for the build chamber that includes at least two separate and independently controllable heating elements by independently driving the at least two heating elements using a pulse-width modulation (PWM) control scheme that staggers an on-cycle among the heating elements to reduce a peak load demand on the power supply;

fabricating a three-dimensional object on the build platform; and blowing air over the heater and toward the build region at a first flow rate before fabrication of the three-dimensional object is initiated for preheating the build region to a predetermined build region temperature and, after preheating the build region to the predetermined build region temperature, increasing a flow rate of air over the heater to a second flow rate for maintaining a target temperature of the build chamber after fabrication of the three-dimensional object is initiated, wherein the second flow rate more vigorously mixes air throughout the build chamber relative to the first flow rate.

12. The method of claim 11 further comprising switching the heating elements off and on in a synchronized fashion.

13. The method of claim 11 further comprising switching the heating elements off and on in a complementary fashion.

14. The method of claim 11 further comprising varying a duty cycle of the heating elements.

15. The method of claim 11 further comprising determining a duty cycle to operate one of the at least two heating elements at a predetermined power, and allocating 50% of the duty cycle to the at least two heating elements.

16. The method of claim 11 further comprising operating one of the at least two heating elements out of phase with another one of the at least two heating elements.

17. The method of claim 16 further comprising operating the heating elements 180 degrees out of phase.

18. The method of claim 16 further comprising operating the heating elements 360/N degrees out of phase, wherein the heater includes a plurality of separate and independently controllable heating elements, wherein "N" is equal to the number of heating elements.

19. The method of claim 11 further comprising varying a heat output from the heating elements according to a target temperature for the build chamber.

20. The system of claim 1 wherein the controller is configured to send a control signal to position the blower.

* * * * *